(12) United States Patent
Chang

(10) Patent No.: US 6,415,407 B1
(45) Date of Patent: Jul. 2, 2002

(54) DEBUGGING DEVICE FOR A SYSTEM CONTROLLER CHIP TO CORRECTLY LEAD ITS SIGNALS TO IC LEADS

(75) Inventor: Nai-Shung Chang, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/306,113

(22) Filed: May 6, 1999

(30) Foreign Application Priority Data

Feb. 26, 1999 (TW) ........................................ 88102910 A

(51) Int. Cl.[7] .............................................. G06F 11/00
(52) U.S. Cl. ...................... 714/734; 714/724; 714/25; 714/27; 714/30
(58) Field of Search ............................. 714/27, 30, 25, 714/734

(56) References Cited

U.S. PATENT DOCUMENTS

| | | | | |
|---|---|---|---|---|
| 4,145,734 A | * | 3/1979 | Bienvenu | 364/200 |
| 4,270,178 A | * | 5/1981 | Lillig | 364/579 |
| 4,404,519 A | * | 9/1983 | Wescott | 324/73 |
| 4,422,141 A | * | 12/1983 | Shoji | 364/200 |
| 4,905,228 A | * | 2/1990 | Angell et al. | 370/84 |
| 4,922,492 A | * | 5/1990 | Fasang et al. | 271/22.1 |
| 4,967,387 A | * | 10/1990 | Shibasaki et al. | 364/580 |
| 4,995,038 A | * | 2/1991 | Brown | 371/16.1 |
| 5,005,173 A | * | 4/1991 | Martin | 371/22.6 |
| 5,132,614 A | * | 7/1992 | Sakumoto et al. | 324/158 R |
| 5,228,139 A | * | 7/1993 | Miwa et al. | 395/575 |
| 5,247,521 A | * | 9/1993 | Akao et al. | 371/16.1 |
| 5,317,711 A | * | 5/1994 | Bourekas et al. | 395/425 |
| 5,343,478 A | * | 8/1994 | James et al. | 371/22.3 |
| 5,363,383 A | * | 11/1994 | Nimishikavi | 371/22.1 |
| 5,392,297 A | * | 2/1995 | Bell et al. | 371/22.6 |
| 5,465,257 A | * | 11/1995 | Yamahata et al. | 371/22.5 |
| 5,525,971 A | * | 6/1996 | Flynn | 340/825.06 |
| 5,541,935 A | * | 7/1996 | Waterson | 371/22.5 |
| 5,768,575 A | * | 6/1998 | McFarland et al. | 395/569 |
| 5,838,692 A | * | 11/1998 | Tobin | 371/22.1 |
| 6,073,254 A | * | 6/2000 | Whetsel | 714/30 |
| 6,128,758 A | * | 10/2000 | Hall et al. | 714/727 |
| 6,145,104 A | * | 11/2000 | Feddeler et al. | 714/724 |
| 6,311,303 B1 | * | 10/2001 | Gates et al. | 714/734 |

OTHER PUBLICATIONS

Reese, Robert B. "Pass Transistor" <http://www.ece.msstate.edu/~reese/EE8273/lectures/pass_transistor/pass_transistor.pdf> [accessed Nov. 14, 2001].*

* cited by examiner

Primary Examiner—Robert Beausoleil
Assistant Examiner—Gabriel Chu
(74) Attorney, Agent, or Firm—Jiawei Huang; J. C. Patents

(57) ABSTRACT

A debugging device is provided for use in a system controller chip on a computer motherboard, such as a Pentium-based computer motherboard, to facilitate a debugging procedure on the system controller chip whenever a malfunction occurs to the system controller chip. Consequently, internal signals of the chip are correctly connected to chip leads. Under normal operating conditions of the system controller chip, the debugging device connects the connecting-pad area to the control unit and disconnects the connecting-pad the control unit and connects the connecting-pad area successively in a predetermined sequence to the function blocks, allowing the function blocks to undergo an on-site debugging procedure one by one. The debugging device allows an on-site debugging procedure on the system controller chip in real time, and also allows the system controller chip to undergo a benchmark test to check for the reliability in the overall functionality of the system controller chip.

13 Claims, 4 Drawing Sheets

DEBUGGING DEVICE FOR A SYSTEM CONTROLLER CHIP TO CORRECTLY LEAD ITS SIGNALS TO IC LEADS

CROSS-REFERENCE TO RELATED APPLICATION

This application claims the priority benefit of Taiwan application serial no. 88102910, filed Feb. 26, 1999, the full disclosure of which is incorporated herein by reference.

BACKGROUND OF THE INVENTION

1. Field of the Invention

This invention relates to computer technology, and more particularly, to a debugging device for use in a system controller chip on a computer motherboard, such as a Pentium-based computer motherboard, to allow an on-site debugging procedure on the system controller chip so as to correctly lead signals to the integrated circuit (IC) leads.

2. Description of Related Art

In this information age, the IBM-compatible (or called Pentium-based) personal computers (PC) have become an indispensable office tool in all works of life, which can run various applications as data processing, multimedia, network, electronic mailing, and so on. A PC is typically constructed on a motherboard which is mounted with various components such as a CPU (central processing unit) for processing data; a chipset containing a system controller for controlling the transfer of input/output data to and from the CPU; a primary memory unit, typically a DRAM (dynamic random-access memory) unit for storing computer data; and various expansion means, such as an AGP (Accelerated Graphic Port) interface for connection to a monitor and PCI (Peripheral Component Interconnect) buses for connection to various other peripheral devices.

FIG. 1 is a schematic block diagram showing the basic system configuration of a typical PC motherboard, which includes a system controller 100, a CPU 102, a memory unit 104, and a graphic adapter 106. These components are interconnected via buses 108. The system controller 100 is typically contained in a single chipset and is used to control the transfer of I/O data between the CPU 102, the memory unit 104, and the graphic adapter 106 via the buses 108.

Debugging is an important task that must be constantly performed on the system controller 100 to check for any failed circuit parts in the system controller 100. With today's high-performance PCs, however, the system controller 100 is becoming more and more complex in its internal architectures, particularly in the FIFO (First-in First-out) buffers and pipelined architectures. When a malfunction occurs, such a high architectural complexity in the system controller 100 would make the debugging highly difficult to carry out. Moreover, when performing a debugging procedure, the external circuitry would be unable to monitor the debugging procedure in an on-site manner.

By the conventional architecture, when a malfunction occurs to the system controller 100, the debugging procedure would firstly involve the use of a chemical solution to etch away the top of the resin compound used to seal the chipset of the system controller 100, and secondly the use of a microscope to visually aid the forming of a plurality of test pads on the chip. These test pads are then used to connect the internal circuitry of the system controller 100 to a test unit that can perform a test on all function blocks in the system controller 100 to check where the malfunction occurs.

One drawback to the use of chemical solution to uncover the chip, however, is that it would easily cause erosion to the chip, thus damaging the internal circuit of the chip. Moreover, the use of microscope in the forming of test pads is quite laborious and inconvenient for the test engineer to carry out. Furthermore, since a system controller chip is typically included with a plurality of function blocks and only one of them can be selected for test at a time, the debugging procedure is often carried out in a trial-and-error manner, which is quite inefficient and requires highly-experienced test engineers to perform. Still moreover, if the debugging procedure is performed in test mode, the test equipment would be unable to simulate the noises that would occur during the operation of the system controller chip, which would make the results of the debugging quite unreliable.

SUMMARY OF THE INVENTION

It is therefore an objective of this invention to provide a debugging device for use in a PC system controller chip, which can be controlled by the BIOS of the PC to perform an on-site debugging procedure on the PC system controller chip whenever a malfunction occurs to the system controller chip.

It is another objective of this invention to provide a debugging device for use in a PC system controller chip, which allows an on-site debugging procedure on the system controller chip through the use of on-site test.

It is yet another objective of this invention to provide a debugging device for use in a PC system controller chip, which allows the system controller chip to undergo a benchmark test to test all the function blocks in the system controller chip.

In accordance with the foregoing and other objectives of this invention, a novel debugging device is provided for use in a PC system controller chip. The debugging device of the invention is provided for use in a system controller chip on a computer motherboard, such as a Pentium-based computer motherboard, to facilitate a debugging procedure on the system controller chip whenever a malfunction occurs to the system controller chip. Under normal operating conditions of the system controller chip, the debugging device connects the connecting-pad area to the control unit and disconnects the connecting-pad area from the function blocks. In the event of a malfunction to the system controller chip, the debugging device responsively disconnects the connecting-pad area from the control unit and connects the connecting-pad area successively in a predetermined sequence to the function blocks, allowing the function blocks to undergo an on-site debugging procedure one by one. The debugging device allows an on-site debugging procedure on the system controller chip in real time, and also allows the system controller chip to undergo a benchmark test to check for the reliability in the overall functionality of the system controller chip.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

In accordance with the invention, three preferred embodiments are disclosed in the following with reference to FIG. 2A, FIG. 2B, and FIG. 2C, respectively.

Figure 1:
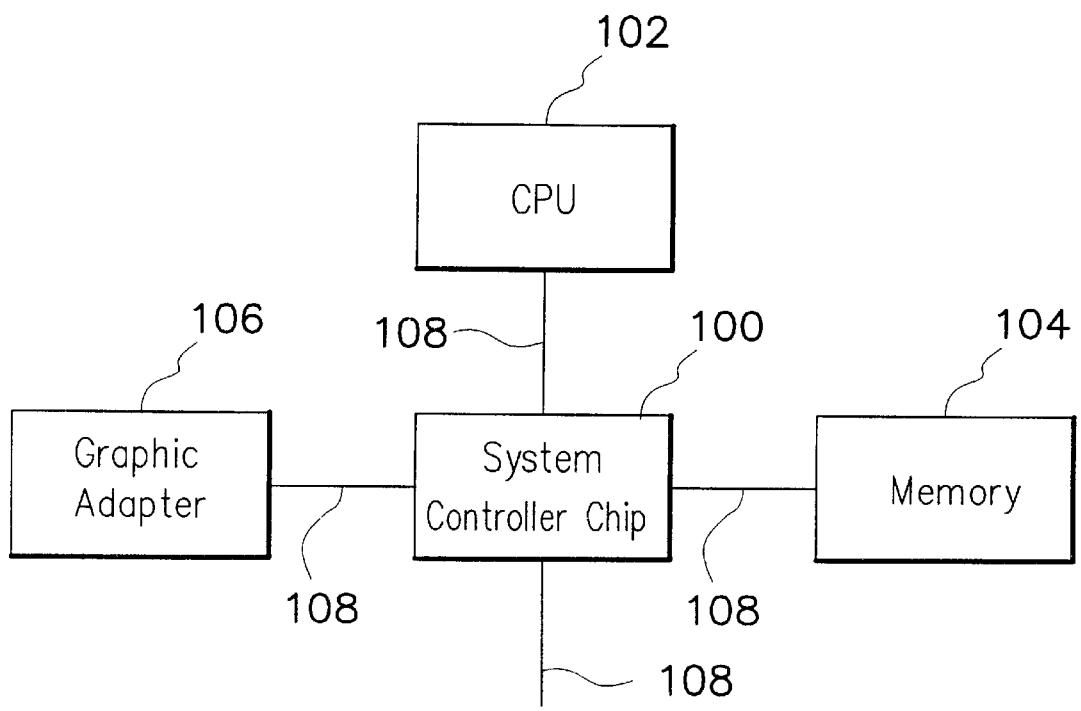
FIG. 1 is a schematic block diagram showing the basic system configuration of a typical PC motherboard.
Figure 2A:
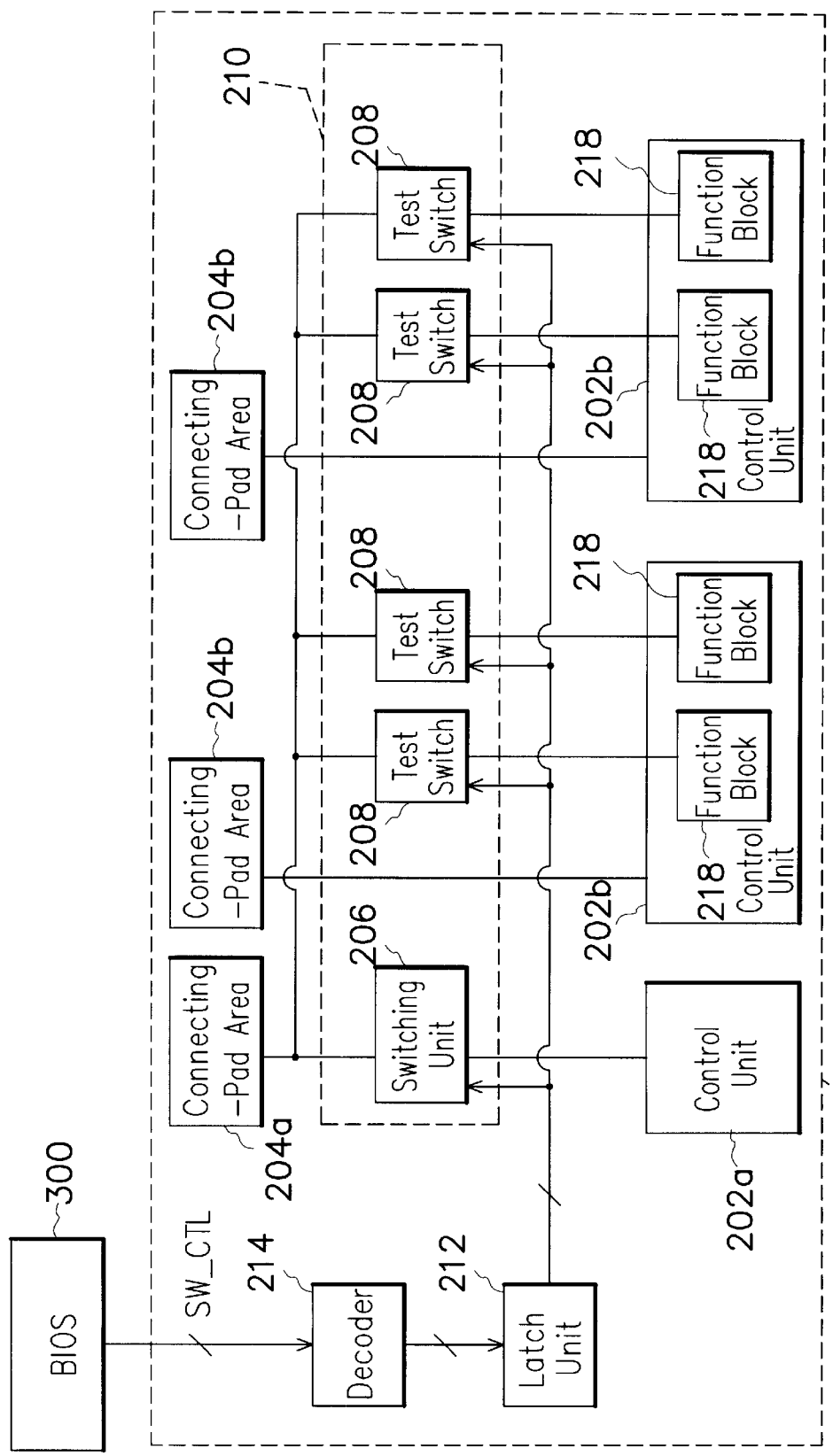
FIG. 2A is a schematic block diagram of a PC system controller chip incorporated with the first preferred embodiment of the debugging device according to the invention.

First Preferred Embodiment (FIG. 2A)

The first preferred embodiment of the invention is disclosed in the following with reference to FIG. 2A, which is utilized in a PC system controller chip shown in FIG. 2A as the part enclosed by the dashed box designated by the reference numeral 200. In use, the PC system controller chip 200 is coupled to a BIOS (Basic Input/Output System) unit 300.

The PC system controller chip 200 includes an infrequently-used control unit 202a, a plurality of frequently-used control units 202b, a latch unit 212, and a decoder 214. Moreover, the PC system controller chip 200 includes a first connecting-pad area 204a and a plurality of second connecting-pad areas 204b. The first connecting-pad area 204a includes a plurality of connecting pads (not shown) for use to electrically connect the infrequently-used control unit 202a to external circuitry (not shown); and the second connecting-pad areas 204b each include a plurality of connecting pads (not shown) for use to electrically connect the respective frequently-used control units 202b to external circuitry (not shown).

Further, each of the frequently-used control units 202b includes a plurality of function blocks 218 of different functions. In accordance with the invention, a switch array 210 is incorporated between the connecting-pad areas 204a, 204b and the two types of control units 202a and 202b. The switch array 210 includes a switching unit 206 having one end connected to the connecting-pad area 204a and the other end connected to the infrequently-used control unit 202a; and a plurality of test switches 208 each having one end connected in common to the connecting-pad area 204a and the other end connected to one of the respective function blocks 218 in the two frequently-used control units 202b. In the case of FIG. 2A, for example, the number of the test switches 208 is four. However, broadly speaking, the number of test switches in the switch array 210 is not limited to the exemplified number of four, and is equal to the number of the function blocks in the frequently-used control units 202b that are to be debugged when a malfunction occurs to the system controller chip 200.

The connecting-pad area 204a in the PC system controller chip 200 includes a plurality of connecting pads (not shown) which are separately connected to, for example, an NC (No Connection) pin to DRAM, a Parity Check pin, an NC pin for CPU, a RESET pin, an NC pin for AGP, a GPAR pin, a WSC#pin, a SUSCLK pin and a SUSTAT pin for PMU (Power Management Unit), an NC pin for PCI, a PAR pin, a SERR#pin, a REQ pin, and a GNT pin. Broadly speaking, the external connections of the connecting-pad area 204a are not limited to these pin assignments. A different design may have different connecting way. For the above example, the connection pads used by various modules are listed in table 1.

TABLE 1

| Module | Available connection pads (in-frequent uses or enhanced uses) |
|---|---|
| DRAM | NC, Parity Check |
| CPU | NC, RESET |
| AGP | NC, GPAR, WSC# |
| PMU | SUSCLK, SUSTAT |
| PCI | NC, PAR, SERR#, REQ, GNT |

(NC: No-Connection)

The switching unit 206 and the test switches 208 in the switch array 210 are switched on or off by a common switch control signal SW_CTL issued by the BIOS unit 300 in response to any malfunction to the system controller chip 200. After being issued, the switch control signal SW_CTL is first decoded by the decoder 214 and then latched in the latch unit 212 to cause the switching unit 206 and the test switches 208 to be switched to the desired states described below.

Under normal operating conditions (i.e., when there is no malfunction to the system controller chip 200), the switching unit 206 in the switch array 210 is set to ON state, while the test switches 208 are all set to OFF state, causing the infrequently-used control unit 202a to be electrically connected via the switching unit 206 to the connecting-pad area 204a for functional interactions with external circuitry (not shown) on the PC system.

In the event of any malfunction to the system controller chip 200, the BIOS unit 300 can detect such a condition and responsively issue a switch control signal SW_CTL which is first decoded by the decoder 214 and then latched in the latch unit 212. The switch control signal SW_CTL is a multi-bit signal which is set in such a manner as to cause the switching unit 206 to be switched OFF while the test switches 208 to be successively switched ON in a predetermined sequence. Meanwhile, the connecting-pad area 204a is connected to a test unit (not shown). This allows the infrequently-used control unit 202a to be temporarily disconnected from the connecting-pad area 204a and the respective function blocks 218 in the frequently-used control units 202b to be successively connected via the respective test switches 208 to the connecting-pad area 204a so as to allow the external test unit (not shown) to perform an on-site debugging procedure on these function blocks 218 one by one.

The foregoing debugging device of the invention allows the debugging of the respective function blocks 218 in the frequently-used control units 202b to use the connecting-pad area 204a, which is normally connected to the infrequently-used control unit 202a, in an on-line manner so as to check which of the function blocks 218 causes the malfunction. The invention allows the debugging procedure to be performed in an on-site manner during the operation of the PC system without having to shut down the PC system so that any bugs in the function blocks can be debugged in real time. Moreover, the invention allows the system controller chip to undergo a benchmark test to check for the reliability in the overall functionality of the system controller chip.

Figure 2B:
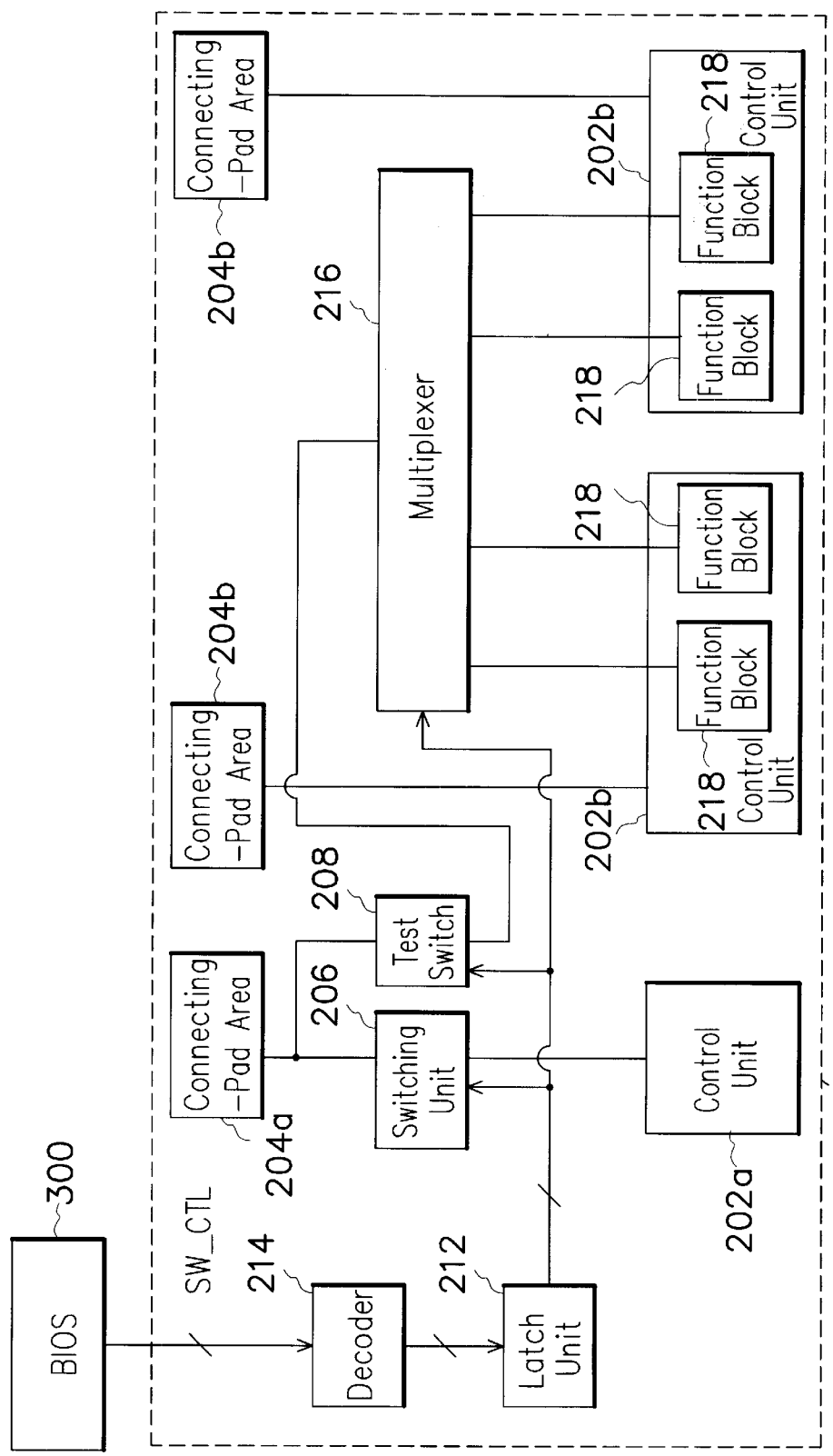
FIG. 2B is a schematic block diagram of a PC system controller chip incorporated with the second preferred embodiment of the debugging device according to the invention.

Second Preferred Embodiment (FIG. 2B)

The second preferred embodiment of the invention is disclosed in the following with reference to FIG. 2B, which is also utilized in a PC system controller chip as the part enclosed by the dashed box designated by the reference numeral 200. In use, the PC system controller chip 200 is coupled to a BIOS (Basic Input/Output System) unit 300.

As shown in FIG. 2B, the PC system controller chip 200 includes an infrequently-used control unit 202a, a plurality of frequently-used control units 202b, a latch unit 212, and a decoder 214. Moreover, the PC system controller chip 200 includes a first connecting-pad area 204a and a plurality of second connecting-pad areas 204b. The first connecting-pad area 204a includes a plurality of connecting pads (not shown) for use to electrically connect the infrequently-used control unit 202a to external circuitry (not shown); and the second connecting-pad areas 204b each include a plurality of connecting pads (not shown) for use to electrically connect the respective frequently-used control units 202b to external circuitry (not shown). Those components are the same as those in the system controller chip 200 of the previous embodiment shown in FIG. 2A.

This embodiment differs from the previous one particularly in that the debugging device of this embodiment includes a switching unit 206, a test switch 208, and a multiplexer 216. The switching unit 206 has one end connected to the infrequently-used control unit 202a and the other end connected to the connecting-pad area 204a. As contrary to the plural arrangement in the previous embodiment, there is only one test switch 208 arranged here in this embodiment, which has one end connected to the output end of the multiplexer 216 and the other end connected to the connecting-pad area 204a. The multiplexer 216 has a plurality of input ends connected respectively to the function blocks 218 in the frequently-used control units 202b, and is under control of a switch control signal SW_CTL to successively select the inputs thereto as its output in a multiplexing manner. The number of the input ends of the multiplexer 216 is dependent on the number of the function blocks in the PC system controller chip 200 that are to be debugged when a malfunction occurs. In the case of FIG. 2B, for example, the multiplexer 216 includes four input ends respectively connected to the four function blocks 218 in the two frequently-used control units 202b.

The switch control signal SW_CTL is a multi-bit signal generated by the BIOS unit 300, and is used to control the ON/OFF states of the switching unit 206 and the test switch 208 and the multiplexing sequence of the multiplexer 216. After being issued, the switch control signal SW_CTL is first decoded by the decoder 214 and then latched in the latch unit 212 so that it can act on the switching unit 206, the test switch 208, and the multiplexer 216.

Under normal operating conditions, (i.e., when there is no malfunction to the PC system controller chip 200), the switching unit 206 is set to ON state and the test switches 208 is set to OFF state, allowing the connecting-pad area 204a to be electrically connected to the infrequently-used control unit 202a while disconnecting the connecting-pad area 204a from the multiplexer 216.

In the event of any malfunction to the PC system controller chip 200, the BIOS unit 300 can detect such a condition and responsively issue a switch control signal SW_CTL via the decoder 214 to the latch unit 212, which causes the switching unit 206 to be switched OFF, the test switch 208 to be switched ON, and the multiplexer 216 to successively select one of its four inputs as its output in a predetermined sequence. Meanwhile, the connecting-pad area 204a is connected to a test unit (not shown). This allows the infrequently-used control unit 202a to be temporarily disconnected from the connecting-pad area 204a, and allows the respective function blocks 218 in the frequently-used control units 202b to be successively connected via the multiplexer 216 and the currently-on test switch 208 to the connecting-pad area 204a so as to allow the external test unit (not shown) to perform an on-site debugging procedure on these function blocks 218 one by one.

Figure 2C:
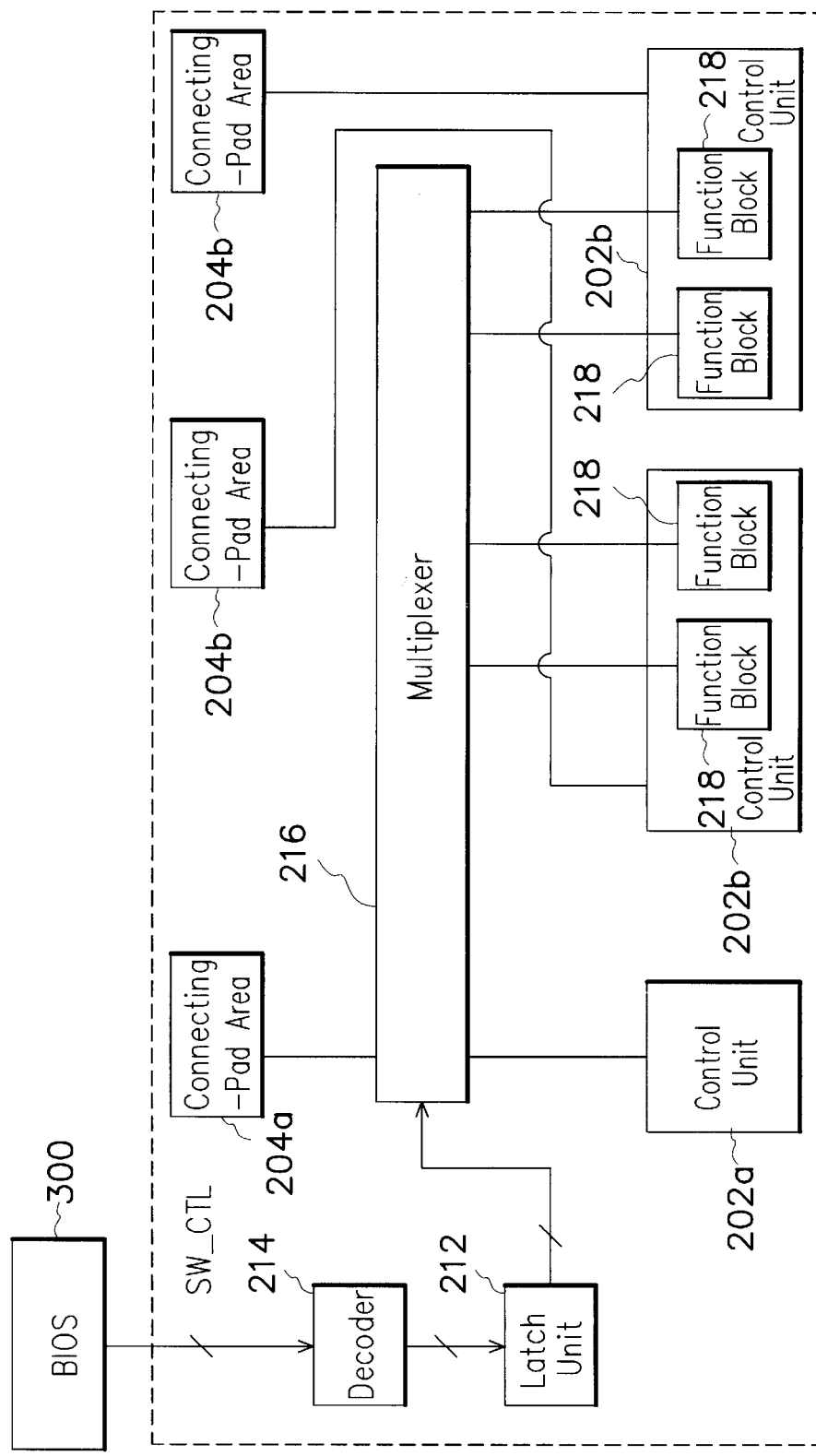
FIG. 2C is a schematic block diagram of a PC system controller chip incorporated with the third preferred embodiment of the debugging device according to the invention.

Third Preferred Embodiment (FIG. 2C)

The third preferred embodiment of the invention is disclosed in the following with reference to FIG. 2C, which is also utilized in a PC system controller chip as the part enclosed by the dashed box designated by the reference numeral 200. In use, the PC system controller chip 200 is coupled to a BIOS (Basic Input/Output System) unit 300.

As shown in FIG. 2C, the PC system controller chip 200 includes an infrequently-used control unit 202a, a plurality of frequently-used control units 202b, a latch unit 212, and a decoder 214. Moreover, the PC system controller chip 200 includes a first connecting-pad area 204a and a plurality of second connecting-pad areas 204b. The first connecting-pad area 204a includes a plurality of connecting pads (not shown) for use to electrically connect the infrequently-used control unit 202a to external circuitry (not shown); and the second connecting-pad areas 204b each include a plurality of connecting pads (not shown) for use to electrically connect the respective frequently-used control units 202b to external circuitry (not shown). Those components are the same as those shown in the PC system controller chip 200 of the previous embodiments shown in FIGS. 2A and 2B.

This embodiment differs from the previous two particularly in that the debugging device of this embodiment includes only a multiplexer 216 and no switching unit and test switch. The multiplexer 216 has an output end connected to the connecting-pad area 204a and a plurality of input ends connected respectively to the infrequently-used control unit 202a and all the function blocks 218 in the frequently-used control units 202b. The multiplexer 216 is controlled by a switch control signal SW_CTL to successively select the inputs thereto as its output in a predetermined manner. The number of the input ends of the multiplexer 216 is dependent on the number of the function blocks in the PC system controller chip 200 that are to be debugged when a malfunction occurs. In the case of FIG. 2C, for example, the multiplexer 216 includes five input ends, one for the infrequently-used control unit 202a and the other four for the four function blocks 218 in the frequently-used control units 202b.

The switch control signal SW_CTL is a multi-bit signal generated by the BIOS unit 300, and is used to control the multiplexing sequence of the multiplexer 216. After being issued, the switch control signal SW_CTL is first decoded by the decoder 214 and then latched in the latch unit 212 so that it can continuously act on the multiplexer 216.

Under normal operating conditions, (i.e., when there is no malfunction to the PC system controller chip 200), the switch control signal SW_CTL is set in such a manner as to cause the multiplexer 216 to constantly select the input end connected to the infrequently-used control unit 202a, so as to electrically connect the infrequently-used control unit 202a to the connecting-pad area 204a. In this case, the function blocks 218 are all disconnected from the connecting-pad area 204a.

In the event of any malfunction to the PC system controller chip 200, the BIOS unit 300 can detect such a condition and responsively issue a switch control signal SW_CTL which is first decoded by the decoder 214 and then latched in the latch unit 212, causing the multiplexer 216 to successively select one of the input ends other than the one connected to the infrequently-used control unit 202a in a predetermined sequence. Meanwhile, the connecting-pad area 204a is connected to a test unit (not shown). This allows the infrequently-used control unit 202a to be temporarily disconnected from the connecting-pad area 204a and the respective function blocks 218 in the frequently-used control units 202b to be successively connected via the multiplexer 216 to the connecting-pad area 204a so as to allow the external test unit (not shown) to perform an on-site debugging procedure on these function blocks 218 one by one.

Conclusion

In conclusion, the debugging device of the invention is characterized in that, under normal operating conditions of the system controller chip, the debugging device connects the connecting-pad area to the control unit and disconnects the connecting-pad area from the function blocks; and in the event of a malfunction to the system controller chip, the debugging device responsively disconnects the connecting-pad area from the control unit and connects the connecting-pad area successively in a predetermined sequence to the function blocks, allowing the function blocks to undergo an on-site debugging procedure one by one. The switch control signal used to control the switching is issued by the BIOS of the PC system and is decoded by a decoder and then latched in a latch unit so that the decoded switch control signal can act on the switching means utilized by the debugging device. The switching means then controls the switching between the connection of the connecting-pad area to the control unit and the connection of the same to the function blocks that are to be debugged.

The incorporation of the debugging device of the invention to the system controller chip would require no alternations and modifications to the existing architectures and functions of the system controller chip, and therefore is easy to implement. The switching means utilized by the debugging device of the invention can be realized in various ways using basic circuit components as the BIOS of the PC system, a decoder, a latch unit, multiplexer, and switches.

Therefore, the debugging device of the invention is more advantageous than the prior art in many aspects. First, the debugging device of the invention can be controlled by the BIOS of the PC to perform an on-site debugging procedure on the PC system controller chip whenever a malfunction occurs to the system controller chip. Moreover, the debugging device of the invention allows an on-site debugging procedure on the system controller chip through an on-site test, which allows the debugging procedure to be more efficient, and thus requires reduced time to accomplish. Still moreover, the debugging device of the invention allows the system controller chip to undergo a benchmark test to test all the function blocks in the system controller chip.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A debugging device for use in a system controller chip to facilitate a debugging procedure on the system controller chip so as to correctly connect chip signals to integrated circuit (IC) chip leads whenever a malfunction occurs to the system controller chip, the system controller chip having a control unit, a plurality of function blocks, and a connecting-pad area, the connecting-pad area being normally coupled to the control unit and the function blocks being intended to undergo the debugging procedure whenever the malfunction occurs to the system controller chip; the debugging device comprising:

a switching unit having a first end connected to the control unit and a second end connected to the connecting-pad area, the switching unit being normally set to ON state so as to connect the connecting-pad area to the control unit under normal operating conditions of the system controller chip;

a plurality of test switches each having a first end connected to the connecting-pad area and a second end connected to one of the function blocks, the test switches being normally set to OFF state so as to disconnect the connecting-pad area to the function blocks under normal operating conditions of the system controller chip; and a BIOS unit for generating a switch control signal in response to a malfunction to the system controller chip for controlling the switching unit and the test switches in such a manner as to switch off the switching unit to disconnect the connecting-pad area from the control unit and meanwhile switch on the test switches successively in a predetermined sequence so as to connect the connecting-pad area successively to the function blocks, allowing the function blocks to undergo an on-site debugging procedure one by one.

2. The debugging device of claim 1, further comprising:
a decoder, coupled to the BIOS unit, for decoding the switch control signal generated by the BIOS unit.

3. The debugging device of claim 2, further comprising:
a latch unit, coupled to the decoder, for latching the decoded switch control signal from the decoder.

4. A debugging device for use in a system controller chip to facilitate a debugging procedure on the system controller chip whenever a malfunction occurs to the system controller chip, the system controller chip having a control unit, a plurality of function blocks, and a connecting-pad area, the connecting-pad area being normally coupled to the control unit and the function blocks being intended to undergo the debugging procedure whenever the malfunction occurs to the system controller chip; the debugging device comprising:

a switching unit having a first end connected to the control unit and a second end connected to the connecting-pad area, the switching unit being normally set to ON state so as to connect the connecting-pad area to the control unit under normal operating conditions of the system controller chip;

a test switch having a first end connected and a second end, with the first end being to the connecting-pad area, the test switch being normally set to OFF state under normal operating conditions of the system controller chip;

a multiplexer having a plurality of input ends respectively connected to the function blocks and an output end connected to the second end of the test switch; and a BIOS unit for generating a switch control signal in response to a malfunction to the system controller chip for controlling the switching unit, the test switch, and the multiplexer in such a manner as to switch off the switching unit to disconnect the connecting-pad area from the control unit and meanwhile switch on the test switch and select the input ends of the multiplexer successively in a predetermined sequence so as to connect the connecting-pad area successively to the function blocks, allowing the function blocks to undergo an on-site debugging procedure one by one.

5. The debugging device of claim 4, further comprising:
a decoder, coupled to the BIOS unit, for decoding the switch control signal generated by the BIOS unit.

6. The debugging device of claim 5, further comprising:
a latch unit, coupled to the decoder, for latching the decoded switch control signal from the decoder.

7. A debugging device for use in a system controller chip to facilitate a debugging procedure on the system controller chip whenever a malfunction occurs to the system controller chip, the system controller chip having a control unit, a plurality of function blocks, and a connecting-pad area, the connecting-pad area being normally coupled to the control unit and the function blocks being intended to undergo the debugging procedure whenever the malfunction occurs to the system controller chip; the debugging device comprising:

a multiplexer having an output end connected to the connecting-pad area and a plurality of input ends respectively connected to the control unit and the function blocks, the multiplexer is normally set in such a manner as to connect the connecting-pad area to the control unit and disconnect the connecting-pad area from the function blocks under normal operating conditions of the system controller chip; and a BIOS unit for generating a switch control signal in response to a malfunction to the system controller chip for controlling the multiplexer in such a manner as to disconnect the connecting-pad area from the control unit and connect the connecting-pad area successively to the function blocks in a predetermined sequence so as to allow the function blocks to undergo an on-site debugging procedure one by one.

8. The debugging device of claim 7, comprising:
a decoder, coupled to the BIOS unit, for decoding the switch control signal generated by the BIOS unit.

9. The debugging device of claim 8, further comprising:
a latch unit, coupled to the decoder, for latching the decoded switch control signal from the decoder.

10. A debugging device for use in a system controller chip to perform a debugging procedure on the system controller chip whenever a malfunction occurs to the system controller chip, the system controller chip having a control unit, a plurality of function blocks, and a connecting-pad area, the debugging device comprising:

a switching array unit having a first end connected to the control unit and the function blocks and a second end connected to the connecting-pad area; and a switching control unit for generating a switch control signal to the switching array unit to select one of the control unit and the function blocks, wherein the selected one is switched on to the connecting-pad area while the others are switched off, wherein the control unit is switched on to the connecting-pad area under a normal operating condition for the system controller chip, and the function blocks are sequentially switched on to the connecting-pad area while the debugging procedure is performed.

11. The debugging device of claim 10, wherein the switching array unit comprises a multiplexer.

12. The debugging device of claim 10, wherein the switching array unit comprises a multiplexer and a single switch, wherein the single switch is only used for connecting the control unit to the connecting-pad area.

13. The debugging device of claim 10, wherein the switching control unit comprise a BIOS system.

* * * * *